United States Patent [19]

Sasuta

[11] Patent Number: 5,542,108
[45] Date of Patent: Jul. 30, 1996

[54] METHOD FOR PROCESSING COMMUNICATION REQUESTS

[75] Inventor: Michael D. Sasuta, Mundelein, Ill.

[73] Assignee: Motorola, Inc., Schaumburg, Ill.

[21] Appl. No.: 265,557

[22] Filed: Dec. 5, 1994

Related U.S. Application Data

[63] Continuation of Ser. No. 829,116, Jan. 30, 1992, abandoned.

[51] Int. Cl.$^6$ .................................... H04Q 7/28
[52] U.S. Cl. ................... 455/34.1; 455/34.2; 455/54.2
[58] Field of Search ................. 455/15, 16, 34.1, 455/34.2, 54.1, 54.2; 370/31

[56] References Cited

U.S. PATENT DOCUMENTS

| | | | |
|---|---|---|---|
| Re. 32,789 | 11/1988 | Lynk, Jr. et al. | 455/34.1 |
| 4,553,263 | 11/1985 | Smith et al. | 455/54.2 |
| 4,554,677 | 11/1985 | Smith et al. | 455/54.2 |
| 4,573,207 | 2/1986 | Smith et al. | 455/34.1 |
| 4,716,407 | 12/1987 | Borras et al. | 455/54.2 |
| 5,054,109 | 10/1991 | Blackburn | 455/34.1 |

*Primary Examiner*—Edward F. Urban
*Attorney, Agent, or Firm*—James A. Coffing; George C. Pappas

[57] ABSTRACT

A communication unit that is registered in a trunked communication system can continue to receive a communication from a first communication unit after initiating a push-to-talk request while the first communication unit is transmitting voice data in the following manner. Having allocated a communication resource to a group of communication units and while processing a request to communicate for the first communication unit, a communication resource allocator receives a request to communicate from a second communication unit to produce a new request to communicate. The communication resource allocator stores the new request to communicate and transmits a response to the second communication unit such that the second communication unit can continue to receive the remainder of the communication from the first communication unit. Once the first communication unit has stopped transmitting its communication, the communication resource allocator retrieves the stored communication request based upon a predetermined retrieval pattern.

6 Claims, 2 Drawing Sheets

METHOD FOR PROCESSING COMMUNICATION REQUESTS

This is a continuation of application Ser. No. 07/829,116, filed Jan. 30, 1992 and now abandoned.

FIELD OF THE INVENTION

This invention relates generally to trunking communication systems and in particular to a method that allows a communication unit to receive a communication after initiating a push-to-talk request.

BACKGROUND OF THE INVENTION

Trunking communication systems are known to comprise a plurality of communication units, a limited number of communication resources that are transceived via a predetermined number of repeaters, or base stations, and a communication resource allocator that allocates a limited number of communication resources among the plurality of communication units. The communication resources may comprise a TDM bus, a carrier frequency, a pair of carrier frequencies, or any RF transmission means. Of the communication resources, one is selected as the control channel to transceive operational data between the communication resource allocator and the communication units. The communication units, which may be portable radios and/or mobile radios, are arranged into talk groups by commonality of use. For example, a talk group may comprise communications that are operated by a police department while another talk group comprises communication units operated by a fire department.

In the thinking communication system, a communication unit initiates a communication for its talk group by transmitting a request to the communication resource allocator. The request typically contains the communication units individual identification code and its talk group identification code. If the communication resource allocator grants the request, a communication resource is allocated to that particular talk group. Typically, the requesting communication unit begins the communication by transmitting voice data. When another member within the talk group wishes to transmit its own voice data, it activates a request to transmit, which is typically done by activating a push-to-talk button. If the requesting communication unit is still communicating when another communication unit transmits a request to communicate, the subsequent requesting communication unit will not receive the remaining communication from the requesting communication unit. This results because the communication resource allocator does not respond to the subsequent request to communicate until the preceding request to communicate has been completed, i.e. the requesting communication unit has finished transmitting its voice data. Therefore, a need exists for a method that allows a communication unit to receive any remaining of communications from another communication unit after it has initiated a request to communicate.

SUMMARY OF THE INVENTION

This need and others are substantially met by the method for receiving a communication after initiating a PTT disclosed herein. In a trunked communication system that comprises a plurality of communication units, a limited number of communication resources that are transceived via a predetermined number of repeaters, and a communication resource allocator that allocates the limited number of communication resources to a group of communication units for a particular communication, wherein a communication unit of the group of communication units transmits a request to communicate when a first communication unit is communicating on the allocated communication resource, the communication unit ceases to receive the communication from the first communication unit, the following discloses a method that will allow the communication unit to continue to receive the communication from the first communication unit after initiating the request to communicate.

After a group of communication units has been allocated a communication resource and while processing a request to communicate for a first communication unit, the communication resource allocator receives a request to communicate from a second communication unit. The communication resource allocator stores this request and transmits a response to the second communication unit that such the second communication unit can receive the remainder of the communication from the first communication unit. Once the first communication unit has stopped transmitting its communication, the communication resource allocator retrieves the stored communication request based upon a predetermined retrieval pattern.

DESCRIPTION OF A PREFERRED EMBODIMENT

Figure 1:
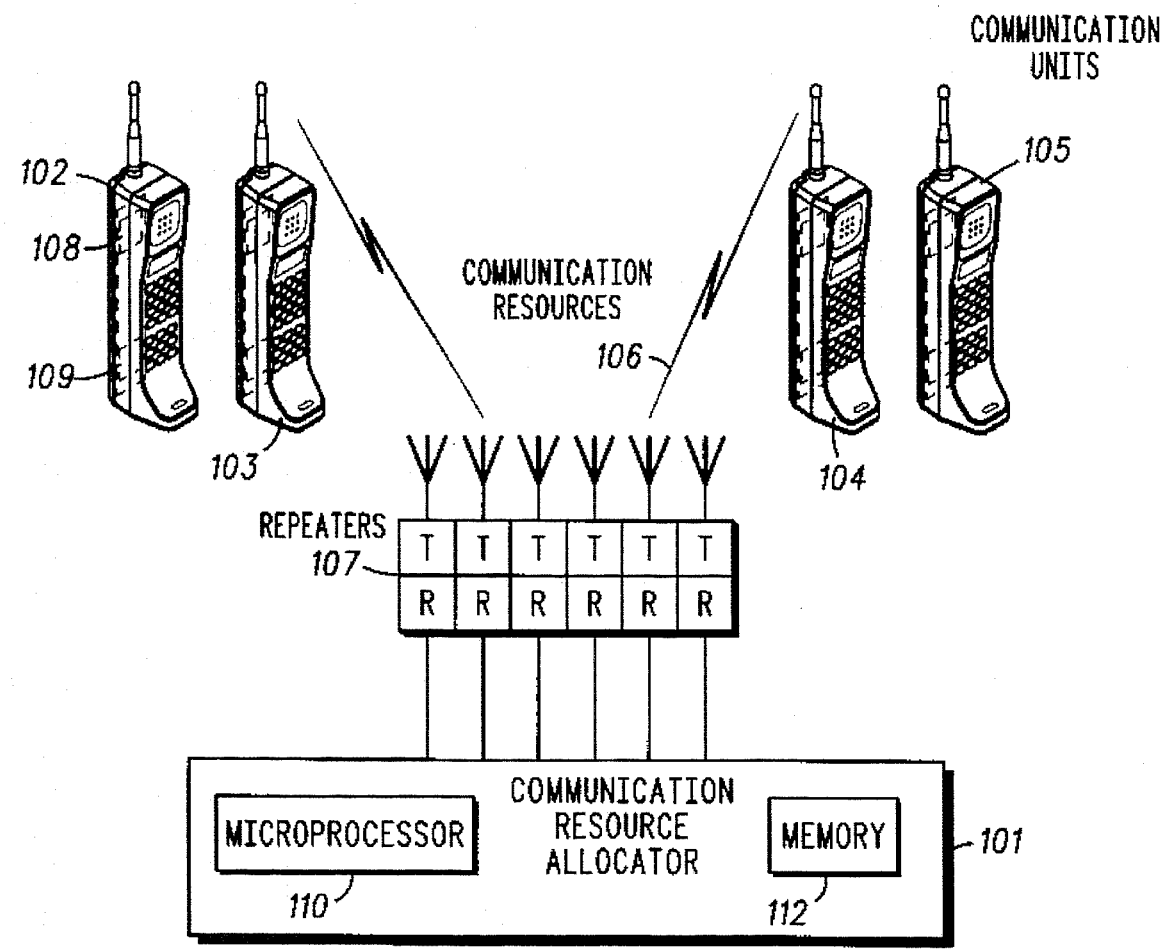
FIG. 1 illustrates a trunked communication system that may incorporate the present invention.

FIG. 1 illustrates a trunking communication system comprising a communication resource allocator 101, a plurality of communication units (four shown) 102–105, a limited number of communication resources 106, and a limited number of repeaters 107. Each of the communication units 102–105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102–105 and the communication resource allocator 101 via the repeaters 107, wherein the repeaters may comprise base stations. One of the communication resources 106 is selected as the control channel which transceives trunking communication system control data between the communication resource allocator and the communication units 102–105.

A communication between communication units is established in a trunking communication system when one of the communication units transmits an inbound signalling word (ISW) to the communication resource allocator. The ISW contains an individual identification code of the requesting communication unit, identification code or codes of the other communication units, and a request for allocation of a communication resource. The communication resource allocator 101 processes the ISW and transmits an outbound signalling word (OSW) in response. If the OSW grants a communication resource to the requesting communication unit and the other communication units, the communication can begin. During the communication, a second communication unit may request access to the allocated communication resource while a first communication unit is accessing it. To prevent the second communication unit from not receiving the remaining portion of the first communication unit's communication (i.e. the portion of the communication that was transmitted after the second communication unit transmitted its request to communicate), the method of FIG. 2 may be employed.

Figure 2:
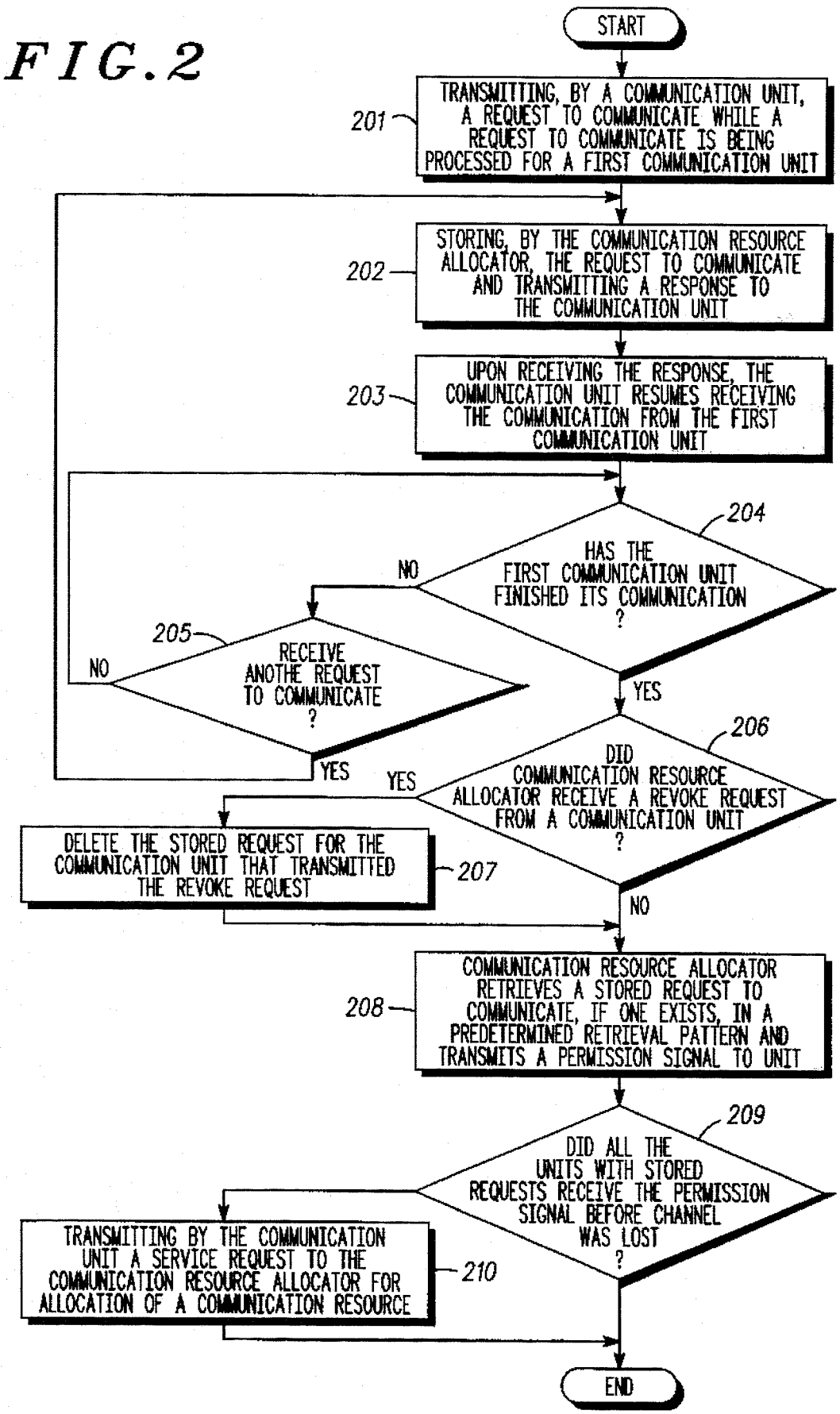
FIG. 2 illustrates a logic diagram of an implementation of the present invention.

Referring to step 201 of FIG. 2, the process begins when a second communication unit transmits a request to communicate while the communication resource allocator is processing a request to communicate for a first communication unit. A communication unit transmits a request to communicate by using the well known push-to-talk (PTT) button which is available on most Motorola communication units. The communication resource allocator processes a request to communicate by granting access to the allocated communication resource to a requesting communication unit, for FIG. 2, it is the first communication unit. The processing of a request to communicate is well known, thus no further discussion will be presented.

Once the second communication unit's request to communicate is received, the communication resource allocator stores it and transmits a response to the second communication unit 202. The response to the communication unit comprises an acknowledgement that the request to communicate was received. The second communication unit, upon receiving the response, resumes receiving the communication from the first communication unit 203. As mentioned above, when a communication unit transmits a request to communicate via a PTT feature, it is incapable of receiving communications from other communication units until a response to the request to communicate is received.

After transmitting the response 203, the communication resource allocator determines whether the first communication unit has finished its communication 204. If the first communication unit has not finished its communication, the communication resource allocator determines whether it has received another request to communicate from another communication unit 205. If the communication resource allocator does not receive another request to communicate, it waits either for the first communication unit to finish its communication or to receive another request to communicate. If the communication resource allocator receives another request to communicate 205, the process continues at step 202 for the new request to communicate.

When the first communication unit finishes its communication 204, the communication resource allocator determines whether it has received a revoke request message from a communication unit. A revoke request message is a request from a communication unit (i.e. the second communication unit or one of the other communication units that transmitted a request to communicate while the first communication unit was communicating) to delete the request to communicate for that communication unit. If the communication resource received a revoke request message 206, the communication resource allocator deletes the request to communicate for that particular communication unit 207. If the communication resource allocator did not receive a revoke request message or after it has deleted the stored request to communicate message, the communication resource allocator retrieves a stored request to communicate, if one exists, in a predetermined retrieval pattern. After retrieving a stored request to communicate, the communication resource allocator transmits a permission signal to the communication unit that transmitted the request. The predetermined retrieval pattern may be established to retrieve priority requests before non-priority requests, or retrieve requests in a first in first out basis, or a in method that will provide the best service for the communication system.

After transmitting a permission signal to a communication unit 208, the communication resource allocator determines whether all the stored requests to communicate signals have been processed. If all the stored requests to communicate have been processed 209, the algorithm is complete for this particular communication and the allocation of the communication resource is deleted. If, however, all the requests to communicate were not processed before the allocation of the communication resource was deleted 209, each communication unit that did not have its request to communicate processed will transmit a service request to the communication resource allocator 210. The service request is similar to a request that a communication unit would transmit to establish an original communication. Having transmitted a service request, the algorithm ends for this particular communication and begins a new one.

By employing the algorithm of FIG. 2, a requesting communication unit that has activated a FIT signal, or similar function, can continue to receive a communication from another communication unit that was accessing the allocated communication resource when the PTT was activated. In prior art systems, the communication resource allocator did not respond to the PTT signal until the communication from the other communication unit was completed. By not processing the PTT request until the ongoing communication was completed, prior art systems prevented requesting communication units from receiving remaining portions of the ongoing communication. This is substantially overcome by the present invention.

I claim:

1. In a trunking communication system that comprises a plurality of communication units, a limited number of communication resources that are transceived via a predetermined number of repeaters, and a communication resource allocator that allocates the limited number of communication resources to a talk group of communication units for a particular communication, wherein a first communication unit of the talk group transmits a request to communicate to the communication resource allocator while a second communication unit of the talk group is communicating with the talk group on an allocated communication resource, a method for the communication resource allocator to process the request to communicate from the first communication unit, the method comprising the steps of:
by the communication
a) while the second communication unit is communicating with the talk group on the allocated communication resource, receiving a request to communicate from the first communication unit to produce a new request to communicate;
b) storing the new request to communicate to produce a stored communication request;
c) transmitting a response to the request to communicate to the first communication unit, wherein the first communication unit, upon receiving the response, resumes receiving the remainder of the communication from the second communication unit; and
d) after the second communication has stopped communicating with the talk group, retrieving the stored communication request based upon a predetermined retrieval pattern, and then transmitting a permission signal to the first communication unit.

2. The method of claim 1 wherein the predetermined retrieval pattern of step (d) comprises a step of retrieving a stored communication request based on an individual priority level of the communication unit that produced the stored communication request.

3. The method of claim 1 wherein the response transmitted in step (c) comprises a step of transmitting an indicator that the request to communicate has been stored.

4. The method of claim 1 further comprises a step of deleting the stored communication request when a revoke request message is received from the first communication unit.

5. In a trunking communication system that comprises a plurality of communication units, a limited number of communication resources that are transceived via a predetermined number of repeaters, and a communication resource allocator that allocates the limited number of communication resources to a talk group of communication units for a particular communication, wherein a first communication unit of the talk group transmits a request to communicate to the communication resource allocator while a second communication unit of the talk group is communicating with the talk group on an allocated communication resource, a method for processing the request to communicate from the first communication unit, the method comprising the steps of:

by the first communication unit:
a) while the second communication unit is communicating with the talk group on the allocated communication resource, transmitting a request to communicate to the communication resource allocator;
b) from the communication resource allocator, receiving a response to the request to communicate to produce a received response;
c) storing the received response; and
d) after storing the received response, resuming to receive the remainder of the communication from the second communication unit.

6. The method of claim 9 further comprises a step of transmitting, by the first communication unit, a revoke request message to the communication resource allocator that indicates that the first communication unit no longer requests to communicate on the allocated communication resource.

* * * * *

UNITED STATES PATENT AND TRADEMARK OFFICE
CERTIFICATE OF CORRECTION

PATENT NO. : 5,542,108
DATED : July 30, 1996
INVENTOR(S) : Michael D. Sasuta

It is certified that error appears in the above-indentified patent and that said Letters Patent is hereby corrected as shown below:

In col. 4, line 46 after "by the communication" please insert --resource allocator--.

In Col. 6, line 13, "9" should be --5--.

Signed and Sealed this

Eighteenth Day of March, 1997

Attest:

BRUCE LEHMAN

Attesting Officer

Commissioner of Patents and Trademarks